United States Patent [19]
Williams

[11] Patent Number: 6,031,873
[45] Date of Patent: *Feb. 29, 2000

[54] NESTED SHELL MAPPING

[75] Inventor: Richard G.C. Williams, San Diego, Calif.

[73] Assignee: 3Com Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/709,184

[22] Filed: Sep. 6, 1996

Related U.S. Application Data

[60] Provisional application No. 60/020,590, Jun. 24, 1996.

[51] Int. Cl.$^7$ ................................................ H04L 27/00
[52] U.S. Cl. .................................... 375/259; 375/222
[58] Field of Search ......................... 375/222, 261, 375/260, 265, 298, 269, 308, 316, 295, 340; 332/304

[56] References Cited

U.S. PATENT DOCUMENTS

| | | | |
|---|---|---|---|
| 4,993,046 | 2/1991 | Saito et al. | 375/39 |
| 5,048,056 | 9/1991 | Goldstein . | |
| 5,319,650 | 6/1994 | Mizutani et al. | 371/46 |
| 5,418,798 | 5/1995 | Wei | 371/43 |
| 5,428,631 | 6/1995 | Zehavi | 371/43 |
| 5,428,641 | 6/1995 | Long | 375/295 |
| 5,428,646 | 6/1995 | Eyuboglu | 375/354 |
| 5,446,758 | 8/1995 | Eyuboglu | 375/259 |
| 5,465,273 | 11/1995 | Cole | 375/296 |
| 5,486,825 | 1/1996 | Cole | 341/50 |
| 5,511,096 | 4/1996 | Huang et al. | 375/265 |
| 5,598,435 | 1/1997 | Williams | 375/261 |
| 5,818,879 | 10/1998 | Eyuboglu et al. | 375/286 |

OTHER PUBLICATIONS

Khandani and Kabal, *Shaping Multidimensional Signal Spaces—Part I: Optimum Shaping, Shell Mapping*, IEEE Transactions on Information Theory, 39(6):1799, Nov. 1993.

Khandani and Kabal, *Shaping Multidimensional Signal Spaces—Part II: Shell–Addressed Constellations*, IEEE Transactions on Information Theory, 39(6):1809, Nov. 1993.

Motorola Information Systems, *Signal mapping and shaping for V. fast*, CCITT, D196, Jun. 1992.

Laroia, et al., *On Optimal Shaping of Multidimensional Constellations*, IEEE Transactions on Information Theory, 40(4):1044, Jul. 1994.

*Primary Examiner*—Chi H. Pham
*Assistant Examiner*—Jean B Corrielus
*Attorney, Agent, or Firm*—Fish & Richardson P.C.

[57] ABSTRACT

A method and apparatus for shell mapping that is independent of the number of bits to be mapped. Although the number of bits need to be known, the number does not affect the operation of the inventive algorithm and so filling with significant zeros may be used to obtain a large number of bits. This means that any tables used to efficiently implement the algorithm do not need to change when the data rate changes. In particular, the invention orders a set of shell combinations (the N-tuple $[m_1, m_2, \ldots m_N]$ defining a set of shell indices or selectors) such that any group of binary input bits having the same numerical value always selects a same shell combination.

6 Claims, 6 Drawing Sheets

NESTED SHELL MAPPING

This application claims the benefit of U.S. Provisional Application No. 60/020,590, filed Jun. 24, 1996.

BACKGROUND OF THE INVENTION

1. Field of the Invention

This invention relates to telecommunications, and more particularly to a method and apparatus for signal mapping and shaping using an improved shell mapping algorithm.

2. Description of Related Art

In many communication systems, digital bits must be transformed into analog signals for transmission, and the analog signals transformed back into digital bits upon receipt. Generally, a modulator/demodulator (modem) is used to perform these functions. To accommodate the problem of data loss due to noise and other causes, the need for high bit rates, and the need for reliable connections under low power conditions, a variety of error correction codes and modulation schemes have been proposed, and in many instances, adopted by industry.

Typically, data input to a modem is expressed in a binary form. Data is transmitted at a bit rate (e.g., B bits per second), where the bit rate is defined as the number of bits to be transmitted and received, including the actual binary information data and a predetermined number of redundancy bits needed by coding in a selected system. During transmission, the binary data is typically transmitted and received in a form of a series of symbols at a symbol rate of S symbols per second. Thus, each symbol contains B/S bits of binary data.

Each symbol can be represented by one of the possible line signal states generated by the modem. Various modulation techniques may be used to convert data into line signal states. For example, in quadrature amplitude modulation (QAM), the line signal states can be represented by a set of complex numbers, namely by a set of points in a two-dimensional signal constellation. For example, for a bit rate B and a symbol rate S, where B/S is an integer D, a signal constellation of size $2^D$ is needed to represent D bits in each symbol. Thus, if B=12000 bits/second and the symbol rate S is 2400 symbols/second, D=5 bits/symbol, and a 32-point two-dimensional signal constellation is used, providing a scheme for mapping one out of 32 possible complex signal points according to 5 input data bits.

However, for high speed modems, multiple symbol rates and bit rates may be used to facilitate more efficient use of the available channel bandwidth. In such instances, the ratio B/S may not be always an integer; that is, the data rate is not always a multiple of the symbol rate. To accommodate this, a scheme that maps an integer number of bits to several symbols is needed. Several ways of doing this have been defined, including switched constellations, modulo mapping, and shell mapping.

Shell mapping has been adopted for the ITU-T V.34 modem standard. In shell mapping, a two-dimensional signal constellation is partitioned into M equal size "shells" each of which contains R signal points. R is typically chosen to be $2^v$, where v is an integer greater than or equal to zero. For Q input data bits, K=Q−(N*v) bits, are used for shell mapping, generating N shell indices or selectors $m_i$ (i=1, 2, ... N) ranging from 0 to M−1. For each symbol, one of these shell indices is used to choose a corresponding one of the M shells in the signal constellation, and v bits are used to choose one of the $2^v$ points within that shell. If a convolutional encoder is employed, among v bits, c bits are coding bits which are the output of the convolutional encoder, and are used to select one of the $2^c$ subsets. The remaining u=v−c bits are used to select one of the $2^u$ points in the chosen subset in the chosen shell. When no convolutional encoder is employed, c=0 and u=v. The constellation size is $L=M*2^{u+c}$. The signal constellation may be partitioned into subsets according to Ungerboeck set partitioning principles, as is known in the art.

In order to select the N-tuple [$m_1, m_2, \ldots m_N$] using K bits, first a "cost" is assigned to each shell. Since a main purpose of an efficient mapping scheme is to achieve a low average signal power, the average signal power within a shell is assigned as its "cost". However, for computational convenience, the "cost" is set to the shell index. Thus, the innermost shell has cost 0, the next shell has cost 1, and so on. This approximation is quite workable, in particular as the constellation becomes larger. Since costs are additive, the total costs of N symbols is $m_1+m_2 \ldots +m_N$. Note that there are $M^N$ combinations of N shell indices, but only $2^K \leq M^N$ input K-bit combinations. Thus, certain combinations of shells will be excluded. In conventional systems, an efficient shell mapping scheme minimizes the cost by selecting the $2^K$ combinations that have the least total cost. If the input K bits is expressed as a number X, a conventional shell mapping algorithm ensures that as X increases, the corresponding total cost is non-decreasing.

In most implementations of shell mapping, particular shells are selected on a frame-by-frame basis by an algorithm that can be implemented efficiently on a fixed-point digital signal processor (DSP) using look-up tables. In this method, signal shaping and mapping are integrated in a seamless fashion. Further details of conventional shell mapping are set forth in Signal mapping and shaping for V.fast, Motorola Information Systems contribution D196, CCITT Study Group XVIII, Geneva, June 1992, and U.S. Pat. No. 5,428,641 to Long, assigned to Motorola, Inc., which is hereby incorporated by reference.

Since the V.34 modem standard was finalized, there has been much interest in seamless data rate changing. It has been suggested that seamless rate changing can be used as a fast rate changing method on rapidly varying channels or as a rate negotiation method that minimizes short term affects on throughput. Both of these goals are achievable and several methods to implement such functionality have already been proposed within standards committees.

All of the schemes proposed to date need to know the number of bits to be mapped before they can be implemented. This becomes a burdensome restriction when rapid rate changing is needed. In the V.34 modem standard, a shell mapping algorithm that maps an integer number of bits to 8 symbols is used. The number of bits is determined based on the desired data rate and symbol rate, and tables are then calculated to efficiently implement the algorithm. When changing data rate, new tables are calculated while still using the old tables. A problem has been that, after negotiation of a new rate, a certain amount of time must be allowed for new shell mapping tables to be generated. This approach also takes extra memory, since multiple tables must exist concurrently.

It would be desirable to have a method of changing data rates that avoids these problems. The present invention provides such a method.

SUMMARY OF THE INVENTION

The invention comprises a method and apparatus for shell mapping that is independent of the number of bits to be mapped. Although the number of bits need to be known, the number does not affect the operation of the inventive algorithm and so filling with significant zeros may be used to obtain a large number of bits. This means that any tables used to efficiently implement the algorithm do not need to change when the data rate changes. In particular, the invention orders a set of shell combinations (the N-tuple [$m_1$, $m_2$, ... $m_N$] defining a set of shell indices or selectors) such that any group of binary input bits having the same numerical value always selects a same shell combination.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Overview

In the V.34 standard, shell combinations (the N-tuple [$m_1$, $m_2$, ... $m_N$] defining a set of shell indices or selectors) are picked in an order that increases cost (i.e., [$m_1+m_2+...+m_N$]) with the numerical representation of the input bits. For example, the $138^{th}$ shell combination will have a higher cost than the $27^{th}$ shell combination. This means that the maximum number of shells available must be known beforehand, and this is related to the number of input bits. As the number of input bits change (with data rate), the number of shells allowed also varies, and so the ordering of the shell combinations changes. This leads to a situation where a certain numerical representation of input bits results in different shell combinations depending on the number of leading zeroes. For example, shell combination number 138 for 12 input bits will be different from shell combination number 138 for 23 input bits.

It is possible to take a different approach where shell combinations are picked in an order that remains constant regardless of the number of leading zeroes. In other words, the same numerical representation of a group of input bits will always select the same shell combination. The order should also aim to have increasing cost with increasing numerical representation, but this will no longer be a strict requirement.

The invention comprises a method and apparatus for shell mapping that is independent of the number of bits to be mapped. Although the number of bits need to be known, the number does not affect the operation of the inventive algorithm and so filling with significant zeros may be used to obtain a large number of bits. In other words, a bit pattern that would give the decimal number 138 will produce the same output of symbols (shell combination number 138) if it is a 12-bit pattern or if it is a 23-bit pattern. This means that any tables used to efficiently implement the algorithm do not need to change when the data rate changes.

Consider the order of number pairs 00, 10, 01, 11, 20, 02, 21, 12, 22, 30, 03, 31, 13, 32, 23, 33, 40, 04, 41, 14, 42, 24, 43, 34, 44, 50, 05, 51, 15, 52, 25, 53, 35, 54, 45, 55. This list contains all 36 pairs of 6 numbers. Input bits can be mapped to these pairs directly. Notice that the list is not in order of strictly increasing cost. Thus, the pair 30 (cost=3) is after the pair 22 (cost=4). If only 4 input bits were to be mapped to this list, the first 16 pairs could be chosen. These 16 pairs use only 4 numbers, which is the minimum number needed to map 4 bits into pairs. The number pairs are "nested", in the sense that the first $n^2$ pairs use only n numbers.

For example, the input bit pattern "1000" (binary 8, representing the $9^{th}$ number in the binary sequence "0000" to "1111") would result in selecting the pair 22 (the $9^{th}$ item in the list). Now, if the input bit pattern "01000" (binary 8) is to be mapped, the inventive algorithm still maps that input to pair 22, even though 6 numbers are now needed to furnish enough pairs for generally mapping 5-bit numbers and the pair 22 is not the $9^{th}$ lowest cost pair. There are 10 pairs in the list with a cost of 3 or less.

This concept can be generalized to combinations of more than two numbers in a similar way to the V.34 shell mapping algorithm. Each pair could represent two halves of an 8 symbol combination. Each half could be broken down into a pair of pairs, and so on.

The Preferred Basic Algorithm

The following algorithm exemplifies the invention. It is based on an ordering of number pairs partitioned into regions 00; 10, 01, 11; 20, 02, 21, 12, 22; 30, ... 33;A0, 0A, A1, 1A, ... A(A–1), (A–1)A, AA. The $n^{th}+1$ region consists of all pairs containing n as the maximum number. (Within each region, the order of pairs may be changed as desired; however, the order shown is preferred since the cost function within each region is strictly non-decreasing). Note that the ordering followed by the V.34 shell mapping algorithm is partitioned into regions so that the $n^{th}+1$ region consists of all pairs with cost n. The inventive algorithm starts with a decimal integer X which represents the input bits for a frame, and transforms X into shell index integers $m_1$, $m_2$, ... $m_N$, were N is the frame size in symbols; in the example below, N=8. After the shell indices are chosen, selection of constellation points and further transformations of the input bits are in accordance with the prior art. The original input is in effect split through a decision tree defined by the regions into N shell indices.

In the preferred embodiment, the invention comprises the following steps, shown in flowchart form in FIGS. 1A–1E (numbers in brackets refer to substeps in the figures):

Step 1: Find the largest integer A that satisfies $X \geq A^8$ (this A defines the largest region of number pairs, the power of 8 corresponds to the frame size in symbols) [100, 102]

Define $f(x)=(x+1)^4-x^4$ [104]

Define $Y=X-A^8$ [104]

Define n=0 [104]

Step 2: Subtract f(n) * f(A) from Y [106]

If the result is non-negative, then store it in Y, and go to Step 3 [108, 112]

If the result is negative, then set $B_1$=A and $B_2$=n, and go to Step 4 [108, 110]

Step 3: Subtract f(n) * f(A) from Y [114]

If the result is non-negative, then store it in Y, increment n, and go to Step 2 [116, 118]

If the result is negative, then set $B_1=n$ and $B_2=A$, and go to Step 4 [116, 120]

Step 4:
Define $Y_1=Y$ modulo $f(B_1)$ [122]
Define $Y_2=(Y-Y_1)/f(B_1)$ [122]
Define $g(x)=(x+1)^2-x^2$ [122]
Define $n=0$ [122]

Step 5: Subtract $g(n) * g(B_1)$ from $Y_1$ [124]
If the result is non-negative, then store it in $Y_1$ and go to Step 6 [126, 130]
If the result is negative, then set $C_{11}>B_1$ and $C_{12}=n$, set $n=0$, and go to Step 7 [126, 128]

Step 6: Subtract $g(n) * g(B_1)$ from $Y_1$ [132]
If the result is non-negative, then store it in $Y_1$, increment n and go to Step 5 [134, 138]
If the result is negative, then set $C_{11}=n$ and $C_{12}=B_1$, set $n=0$, and go to step 7 [134, 136]

Step 7: Subtract $g(n) * g(B_2)$ from $Y_2$ [140]
If the result is non-negative, then store it in $Y_2$, and go to Step 8 [142, 144]
If the result is negative, then set $C_{21}=B_2$ and $C_{22}=n$, and go to Step 9 [142, 146]

Step 8: Subtract $g(n) * g(B_2)$ from $Y_2$ [148]
If the result is non-negative, then store it in $Y_2$, increment n, and go to Step 7 [150, 154]
If the result is negative, then set $C_{21}=n$ and $C_{22}=B_2$, and go to Step 9 [150, 152]

Step 9:
Define $Y_{11}=Y_1$ modulo $g(C_{11})$ [156]
Define $Y_{12}=(Y_1-Y_{11})/g(C_{11})$ [156]
Define $Y_{21}=Y_2$ modulo $g(C_{21})$ [156]
Define $Y_{22}=(Y_2-Y_{21})/g(C_{21})$ [156]
If $Y_{11}$ is even, then $m_1=C_{11}$ and $m_2=Y_{11}/2$, else $m_1=(Y_{11}-1)/2$ and $m_2=C_{11}$ [156–162]
If $Y_{12}$ is even, then $m_3=C_{12}$ and $m_4=Y_{12}/2$, else $m_3=(Y_{12}-1)/2$ and $m_4=C_{12}$ [164–168]
If $Y_{21}$ is even, then $m_5=C_{21}$ and $m_5=Y_{21}/2$, else $m_5=(Y_{21}-1)/2$ and $m_6=C_{21}$ [170–174]
If $Y_{22}$ is even, then $m_7=C_{22}$ and $m_8$32 $Y_{22}/2$, else $m_7=(Y_{22}-1)/2$ and $m_8=C_{22}$ [176–180]

The function $f(x)$ has a similar role to the function $g_4(p)$ in the V.34 shell mapping algorithm, and the function $g(x)$ has a similar role to the function $g_2(p)$ in the V.34 shell mapping algorithm.

A Numerical Example

Assume that X=17,000 decimal (binary 100 0010 0110 1000). Step 1 gives A=3 and Y=10,439. After steps 2 and 3, $B_1$=3, $B_2$=2, and Y=4839.

Step 4 gives $Y_1$=114 and $Y_2$=27. After steps 5 and 6, $C_{11}$=2, $C_{12}$=3 and $Y_1$=23. After steps 7 and 8, $C_{21}$=1, $C_{22}$=2, and $Y_2$=2.

Step 9 gives $Y_{11}$=3, $Y_{12}$=4, $Y_{21}$=2, and $Y_{22}$=0. So the final result is that X=17,000 maps into the 8 shell index integers $m_1$=1, $m_2$=2, $m_3$=3, $m_4$=2, $m_5$=1, $m_7$=2, and $m_8$=0. Note that the same shell indices would have been chosen if the input had been binary 0100 0010 0110 1000 (adding a leading zero, as might occur after a rate change); in the prior art, this would not have been true.

Performance of Nested Shell Mapping

Since the ordering of the shell combinations is not in strictly ascending cost, there is going to be a performance penalty for the inventive algorithm compared to the V.34 algorithm. This penalty is very small, and is detailed in the table below. For this particular algorithm, there is more degradation in performance for constellations with very few points. For constellations that would be used in normal operation conditions, the degradation is only about 0.2 dB.

TABLE 1

Performance loss of nested shell mapping compared to V.34 (in dB) (bit rate down, symbol rate across)

|      | 2400 | 2743 | 2800 | 3000 | 3200 | 3429 |
|------|------|------|------|------|------|------|
| 2400 | 0.00 |      |      |      |      |      |
| 4800 | 0.74 | 0.38 | 0.03 | 0.00 | 0.00 | 0.00 |
| 7200 | 0.19 | 0.56 | 0.82 | 0.15 | 0.35 | 0.48 |
| 9600 | 0.22 | 0.00 | 0.08 | 0.32 | 0.19 | 0.46 |
| 12000 | 0.21 | 0.28 | 0.44 | 0.22 | 0.13 | 0.00 |
| 14400 | 0.20 | 0.14 | 0.33 | 0.34 | 0.00 | 0.20 |
| 16800 | 0.22 | 0.20 | 0.20 | 0.20 | 0.14 | 0.37 |
| 19200 | 0.22 | 0.22 | 0.23 | 0.19 | 0.20 | 0.20 |
| 21600 | 0.22 | 0.20 | 0.24 | 0.24 | 0.18 | 0.26 |
| 24000 |      | 0.18 | 0.27 | 0.22 | 0.00 | 0.22 |
| 26400 |      | 0.14 | 0.13 | 0.32 | 0.16 | 0.27 |
| 28800 |      |      |      | 0.19 | 0.22 | 0.19 |
| 31200 |      |      |      |      | 0.18 | 0.24 |
| 33600 |      |      |      |      |      | 0.32 |

Extensions of the Inventive Concept

The initial ordering can be changed to be any ordering that is desired. The combinatorics will always work once an ordering is decided.

Although the algorithm given was based on powers of 2, this is not necessary. Starting with an ordering of number triplets will give a similar algorithm in powers of 3. Mixing different orderings will give algorithms that produce any number of symbols desired.

The algorithm given uses the minimum number of shells possible for the decimal number presented. However, there is a power advantage if more shells are used. The algorithm can be used with a bit converter to produce different results. That is, the input can be converted to another number before the nested shell mapping algorithm is applied. This converted number is mapped as above, and the resulting shell combination is used in transmission. The reverse operation is done at a demapper to restore the original input. This will change the power characteristics of the output without drastically increasing the complexity of the overall scheme. For example, consider regions 00, 10; 10, 11; 20, 02, 12, 22, 30; 03, 31, 13, 32, 23, 33. These regions represent $2^8/2, 2^8/2, 4^8/2$, and $4^8/2$ combinations, respectively. This pattern can be extended so that the $2n^{th}$ region represents $(2(n+1))^8/2$ as does the $(2n+1)^{th}$ region. If we order the regions 0, 2, 1, 4, 3, 6, . . . A, A+3, A+2, . . . , then we can map input bits to regions in order. This will give us a different output distribution for the same input. The resulting distribution will use more than the minimum number of shells, and thus will yield a power advantage.

Software Implementation

Figure 1A:
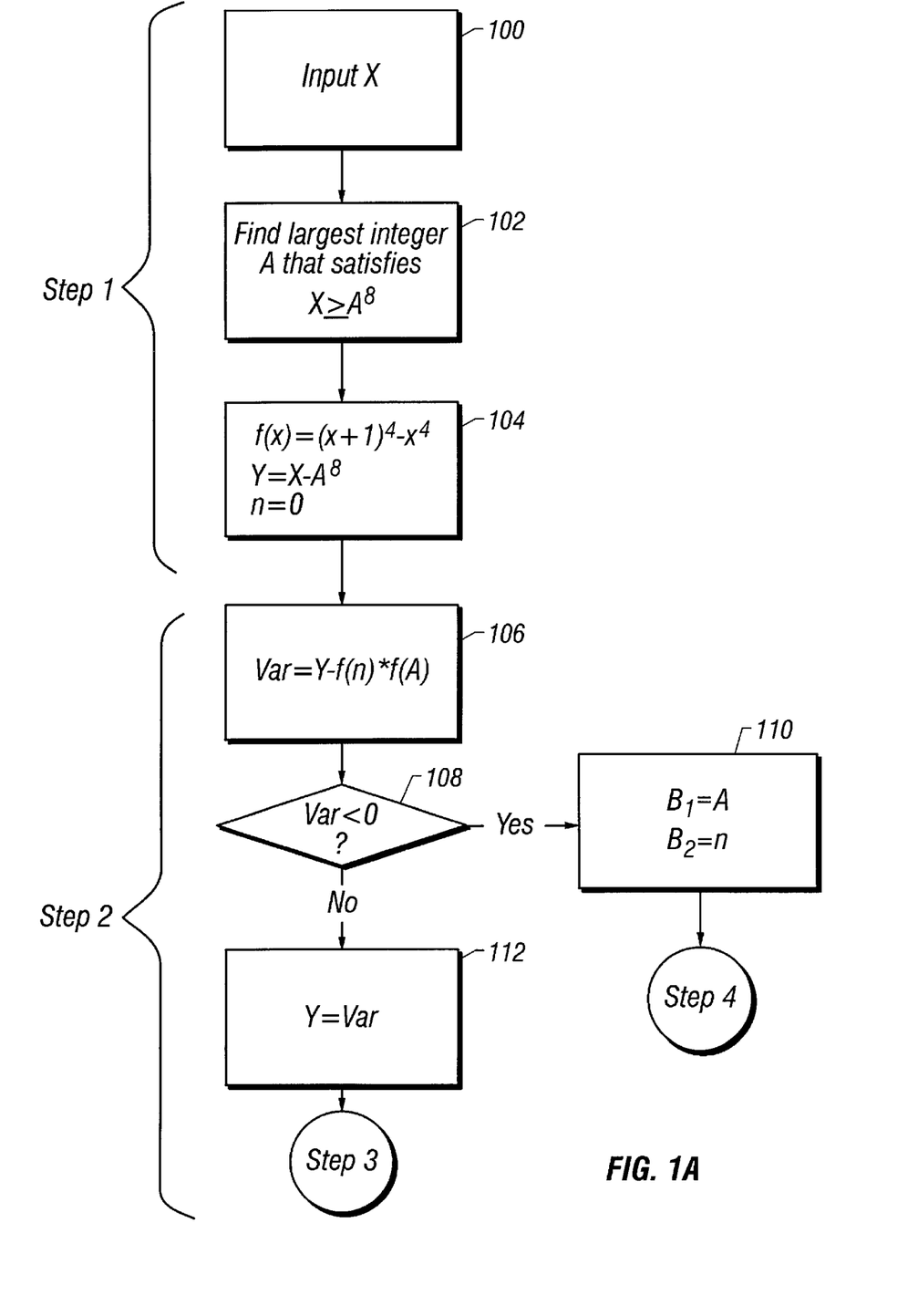
FIGS 1A–1E are a flowchart showing the preferred embodiment of the nested shell mapping algorithm of the present invention.
Figure 1B:
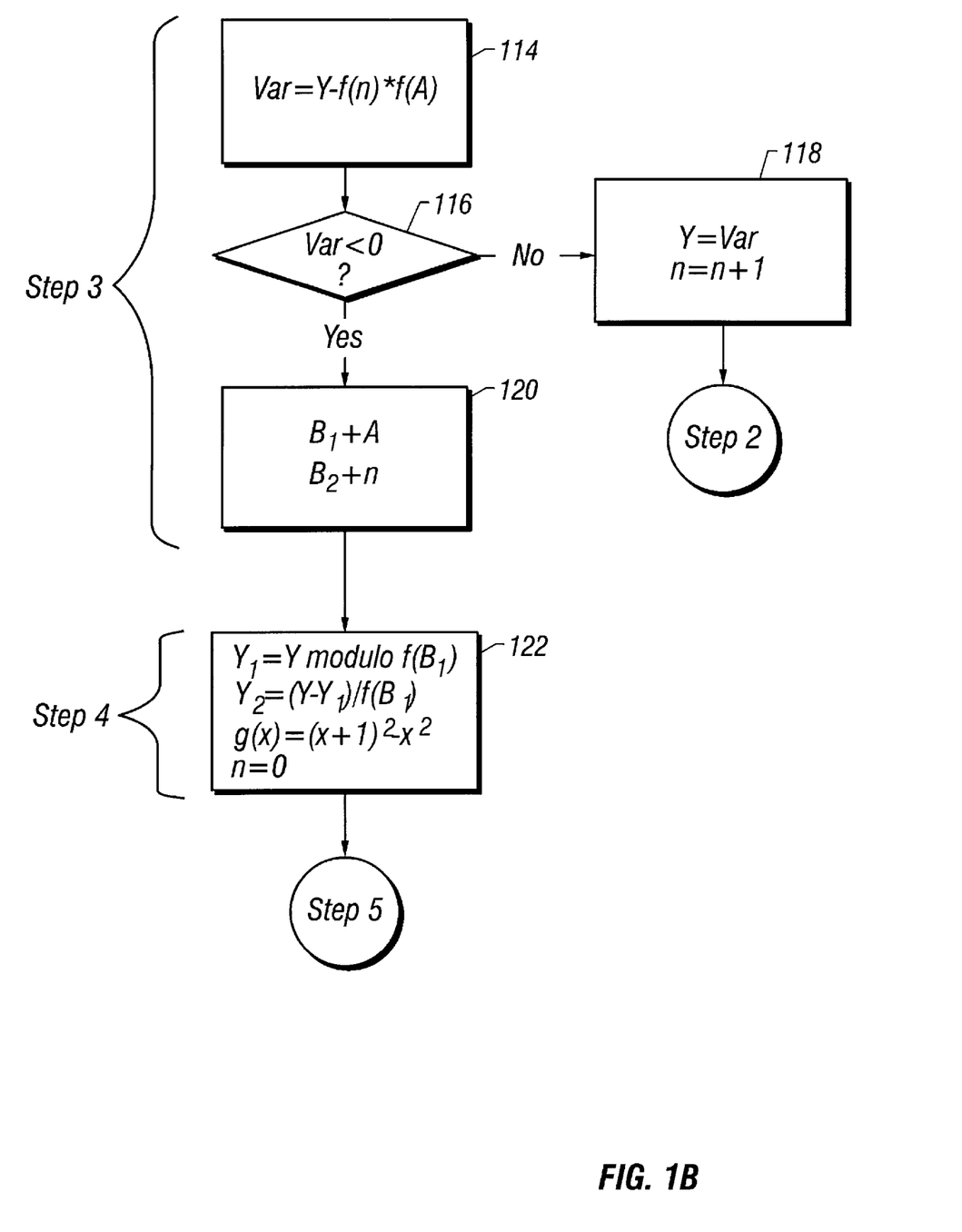
Figure 1C:
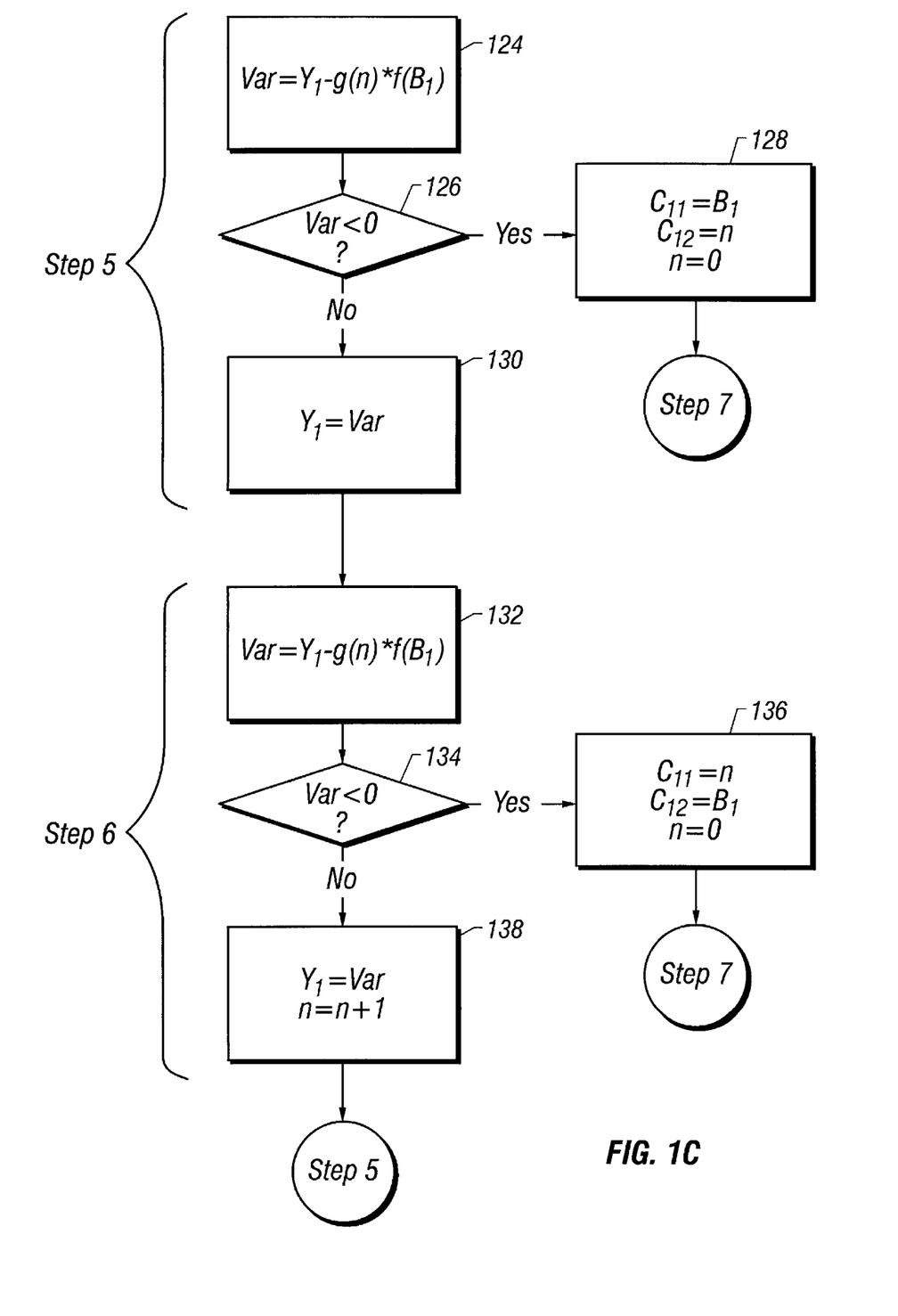
Figure 1D:
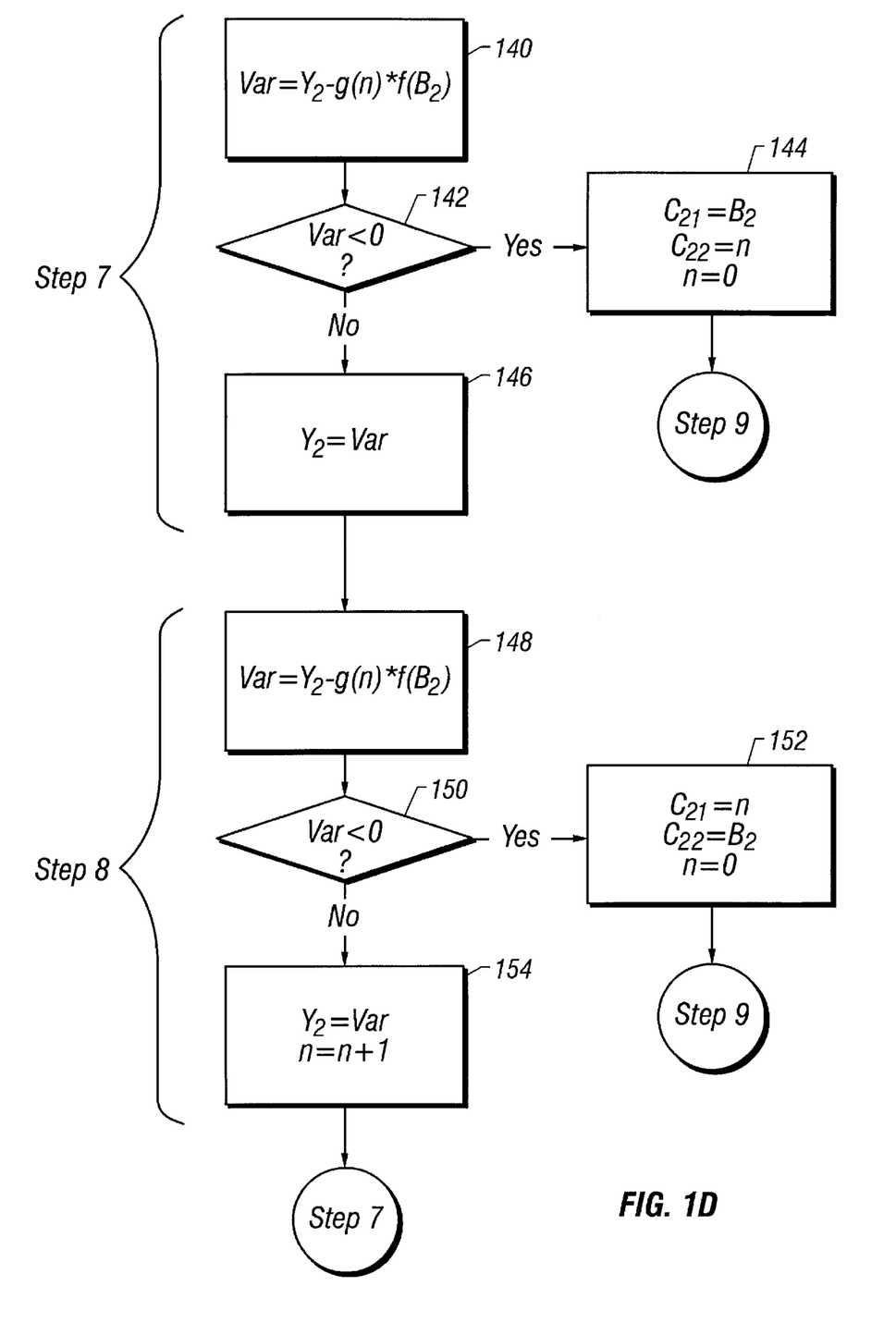
Figure 1E:
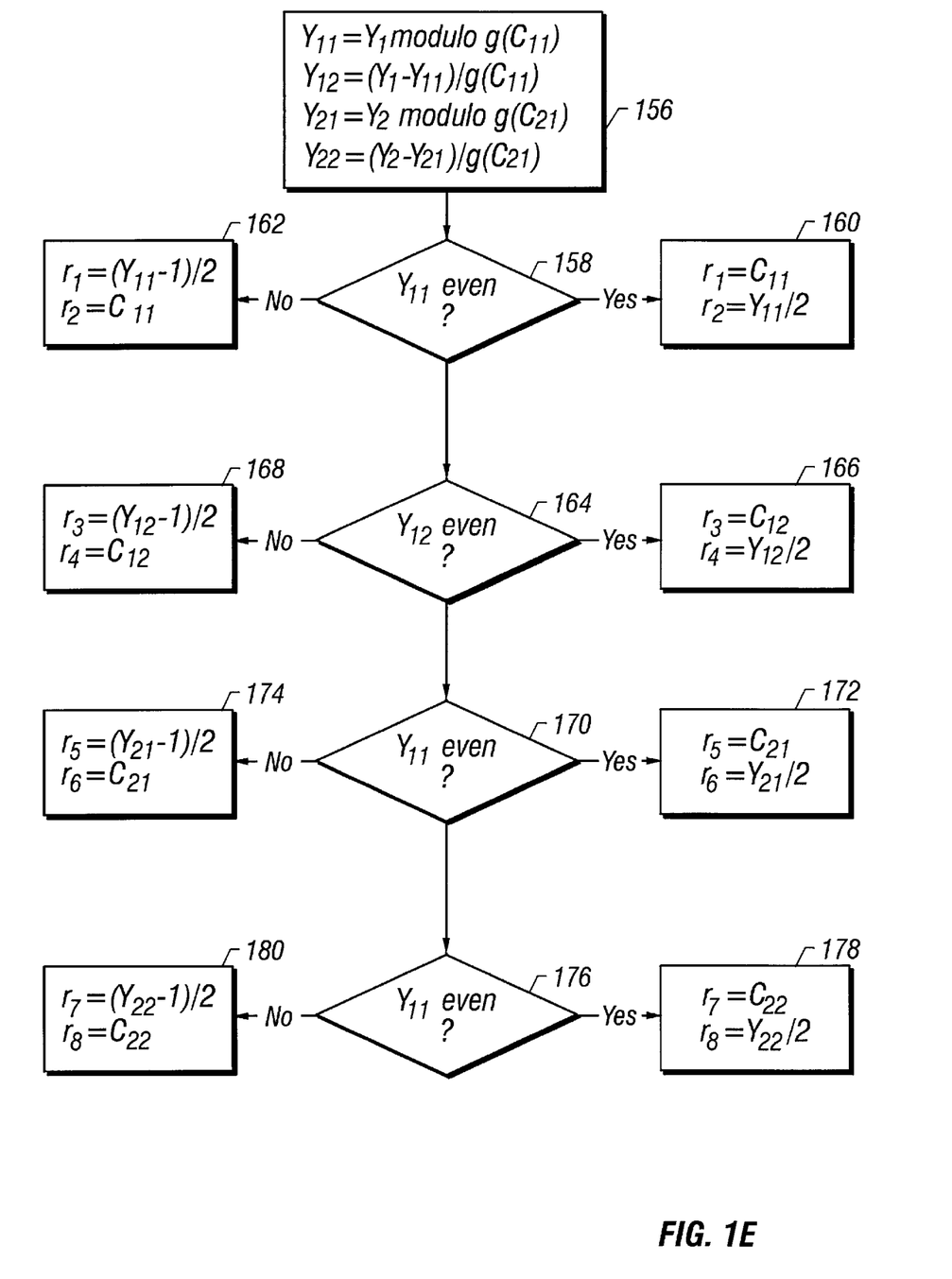
Figure 2:
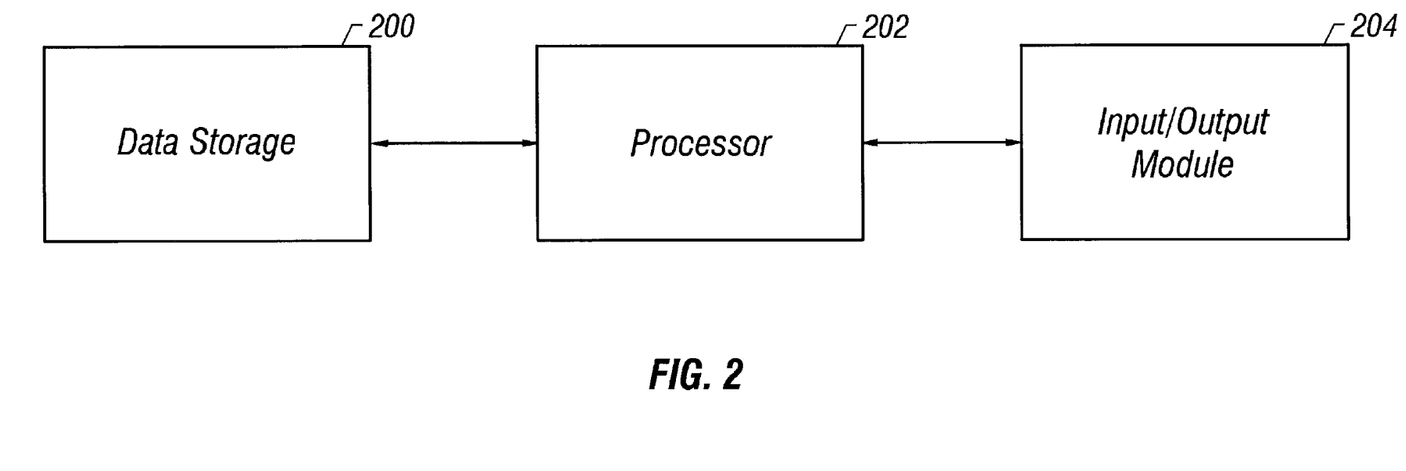
FIG. 2 is a block diagram of a processor system for implementing the preferred embodiment of the present invention.

The method of the invention may be implemented in hardware or software, or a combination of both. However, preferably, the method of the invention is implemented in computer programs executing on a programmable system such as is shown in FIG. 2, including a data storage system (including volatile and non-volatile memory and/or storage elements) 200, a programmable processor 202, and an input/output module 204.

Each program is preferably implemented in a high level procedural or object oriented programming language to communicate with a processor. However, the programs can be implemented in assembly or machine language, if desired. In any case, the language may be a compiled or interpreted language.

Each such computer program is preferably stored on a storage media or device (e.g., ROM, flash RAM, or magnetic diskette) readable by a general or special purpose programmable processor, for configuring and operating the processor when the storage media or device is read by the processor to perform the procedures described herein. The inventive system may also be considered to be implemented as a processor-readable storage medium, configured with a computer program, where the storage medium so configured causes a processor to operate in a specific and predefined manner to perform the functions described herein.

CONCLUSION

Nested shell mapping in accordance with the present invention enables smooth transitions between data rates without the need to compute new shell mapping tables. The combination of nested constellations and nested shell mapping enables the data rate to be changed without affecting the data handling algorithms. Only the number of bits per symbol needs to vary. The inventive algorithm has minimal effect on performance and is a powerful tool in achieving simple and effective seamless rate changing.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A method of mapping binary input bits to shell levels of a signal constellation in a data transmission system, comprising the steps of:
   (a) receiving a plurality of groups of binary input bits, each group having a numerical value;
   (b) ordering a set of shell levels such that any received group of binary input bits having the same numerical value as any other received group of binary input bits always selects a same shell level independent of the number of input bits in such group and regardless of the number of leading zeroes of such binary input bits in such group; and
   (c) selecting, from the set of shell levels and for any one received group, a shell level corresponding to the numerical value of such one received group.

2. A method for mapping binary input bits to shell combinations of a signal constellation for transmission of such binary input bits by means of an analog transmission system capable of being modulated at least in part in response to such shell combinations, comprising the steps of:
   (a) receiving a plurality of groups of binary input bits, each group having a numerical value;
   (b) ordering a set of shell combinations such that any received group of binary input bits having the same numerical value as any other received group of binary input bits always selects a same shell combination independent of the number of input bits in such group and regardless of the number of leading zeroes of such binary input bits in such group;
   (c) selecting, from the set of shell combinations and for any one received group, a shell combination corresponding to the numerical value of such one received group; and
   (d) applying the selected shell combination to modulate the analog transmission system.

3. A system for mapping binary input bits to shell levels of a signal constellation in a data transmission system, comprising:
   (a) means for receiving a plurality of groups of binary input bits, each group having a numerical value;
   (b) means for ordering a set of shell levels such that any received group of binary input bits having the same numerical value as any other received group of binary input bits always selects a same shell level independent of the number of input bits in such group and regardless of the number of leading zeroes of such binary input bits in such group; and
   (c) means for selecting, from the set of shell levels and for any one received group, a shell level corresponding to the numerical value of such one received group.

4. A system for mapping binary input bits to shell combinations of a signal constellation for transmission of such binary input bits by means of an analog transmission system capable of being modulated at least in part in response to such shell combinations, comprising:
   (a) means for receiving a plurality of groups of binary input bits, each group having a numerical value;
   (b) means for ordering a set of shell combinations such that any received group of binary input bits having the same numerical value as any other received group of binary input bits always selects a same shell combination independent of the number of input bits in such group and regardless of the number of leading zeroes of such binary input bits in such group;
   (c) means for selecting, from the set of shell combinations and for any one received group, a shell combination corresponding to the numerical value of such one received group; and
   (d) means for applying the selected shell combination to modulate the analog transmission system.

5. A computer program, stored on a computer-readable medium, for mapping binary input bits to shell levels of a signal constellation in a data transmission system, the computer program comprising instructions for causing a processor to:
   (a) receive a plurality of groups of binary input bits, each group having a numerical value;
   (b) order a set of shell levels such that any received group of binary input bits having the same numerical value as any other received group of binary input bits always selects a same shell level independent of the number of input bits in such group and regardless of the number of leading zeroes of such binary input bits in such group; and
   (c) select, from the set of shell levels and for any one received group, a shell level corresponding to the numerical value of such one received group.

6. A computer program, stored on a computer-readable medium, for mapping binary input bits to shell combinations of a signal constellation for transmission of such binary input bits by means of an analog transmission system capable of being modulated at least in part in response to such shell combinations, the computer program comprising instructions for causing a processor to:
   (a) receive a plurality of groups of binary input bits, each group having a numerical value;
   (b) order a set of shell combinations such that any received group of binary input bits having the same numerical value as any other received group of binary input bits always selects a same shell combination independent of the number of input bits in such group and regardless of the number of leading zeroes of such binary input bits in such group;
   (c) select, from the set of shell combinations and for any one received group, a shell combination corresponding to the numerical value of such one received group; and
   (d) apply the selected shell combination to modulate the analog transmission system.

* * * * *